Patented May 4, 1926.

1,583,660

UNITED STATES PATENT OFFICE.

HERBERT EDWIN COCKSEDGE, OF HARTFORD, ENGLAND, ASSIGNOR TO THE SOLVAY PROCESS COMPANY, OF SOLVAY, NEW YORK, A CORPORATION OF NEW YORK.

SODIUM COMPOUND AND PROCESS OF FORMING THE SAME.

No Drawing.   Application filed October 30, 1922. Serial No. 598,020.

*To all whom it may concern:*

Be it known that I, HERBBERT EDWIN COCKSEDGE, a subject of the King of Great Britain, residing at Hartford, in the county of Chester and Kingdom of England, have invented a new and Improved Sodium Compound and Process of Forming the Same, of which the following is a specification.

As is well known, sodium bicarbonate when heated to a high temperature is converted into sodium carbonate. I have found and my invention is based upon the discovery that when sodium bicarbonate is heated for a time and at a temperature insufficient to effect its conversion into sodium carbonate or sodium sesquicarbonate, a new chemical compound is produced, which analyses indicate may be represented by the formula

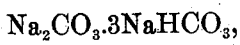

and which has the physical form of fine needle like crystals.

In carrying my invention into effect, I heat sodium bicarbonate, in any suitable pan or vessel to a temperature below that required to effect its complete conversion into sodium carbonate, i. e. below 100° C. and continue the heating at this temperature until the formation of the above new compound is effected. Preferably I employ a temperature between 90° C. and 100° C. and, while conversion may be effected below 90° C., the reaction proceeds but slowly, the best results being obtained at a temperature between 95° C. and 100° C.

The effect of this treatment, as indicated by the probable formula, $Na_2CO_3.3NaHCO_3$, of the new compound, is to bring into reactive relation sodium carbonate and sodium bicarbonate and to cause the reaction between these two reagents to proceed under conditions which are favorable to the formation of the new compound, but not favorable to the formation of dominant amounts of a carbonate bicarbonate mixture as such in the final product or to the conversion of the whole of the material into carbonate. These conditions are obviously maintained in such a way as to preserve the continuance of the desired reaction, i. e. so that no undesired amounts of carbonate, bicarbonate or sesquicarbonate as such shall be found in the ultimate product of the reaction.

The bicarbonate employed should not be or become absolutely dry but should have some water content. An original water content equivalent to that of crude sodium bicarbonate, e. g., the crude bicarbonate from the ammonia soda process containing 12 to 15 per cent moisture is sufficient and this crude bicarbonate may be employed in performing the process. The temperature should not be allowed to rise much, if any, above 100° C. as there is danger that, above this point, the formed compound will be broken up.

In forming the compound some contamination may occur, for example, by undecomposed sodium bicarbonate, or by sodium carbonate formed by breaking down the formed compound by overheating, and care should be taken to avoid this as far as possible.

The new compound is distinguishable from other soda compounds, such as the bicarbonate, carbonate and sesquicarbonate, by its refractive indices, $\alpha$ about 1.435 and $\gamma$ about 1.526. This test applies even though the product be contaminated with such soda compounds and affords a definite means of determining its presence.

The new compound is distinguished from sodium sesquicarbonate by the fact that on heating to approximately 95° C. dry sesquicarbonate whitens and becomes opaque in from two to five minutes, whereas the new compound remains bright. This characteristic supplies a simple and easily executed test for identifying the new product and for distinguishing it from the sesquicarbonate. The test is usually to be carried out as follows: A few of the crystals are placed on a microscope slide and spread out so as to form a single layer of scattered crystals. This slide is placed in an air oven at a temperature between 95° C. and 100° C. for at least two minutes. At a temperature of 95° C. the sesquicarbonate whitens definitely in two minutes and becomes an opaque china white in five minutes, whereas the new compound which is the subject of this application, remains bright and transparent for a much longer period of time. The result can be readily observed with a hand lens or, more conveniently, by means of a microscope.

By reason of its characteristic fine, needle-like crystals this compound forms a fluffy mass which may advantageously be used as an ingredient of washing compounds or utilized as a detergent.

I declare that what I claim is:—

1. The chemical compound having the formula $$Na_2CO_3.3NaHCO_3.$$

2. The chemical compound having the formula $$Na_2CO_3.3NaHCO_3$$

and the refractive indices $\alpha$=about 1.435 and $\gamma$=about 1.526.

3. The sodium compound distinguished by the refractive indices $\alpha$=about 1.435 and $\gamma$=about 1.526.

4. The chemical compound having the formula $$Na_2CO_3.3NaHCO_3$$

and characterized by fine needle-like crystals.

5. A sodium compound having the distinctive refractive indices of $\alpha$ about 1.435 and $\gamma$ about 1.526 and characterized by fine needle-like particles.

6. A chemical compound having the indicated formula $$Na_2CO_3.3NaHCO_3$$

and possessing the property of remaining bright and transparent after exposure for two minutes to a temperature of between 95° C. and 100° C.

7. A sodium carbonate compound intermediate between sodium bicarbonate and sodium sesquicarbonate which can be formed by heating sodium bicarbonate having some water content for a time and at a temperature sufficient to cause evolution of $CO_2$ but not to effect the complete conversion into carbonate of the bicarbonate from which the evolved $CO_2$ is derived.

8. The process of forming a sodium compound intermediate between the bicarbonate and sesquicarbonate which consists in heating moist sodium bicarbonate at a temperature and for a time sufficient to cause evolution of $CO_2$ but not to effect the complete conversion into carbonate of the bicarbonate from which the evolved $CO_2$ is derived.

9. The process of forming a sodium compound distinguished by the refractive indices of $\alpha$ about 1.435 and $\gamma$ about 1.526 which comprises heating sodium bicarbonate at a temperature not materially exceeding 100° C. until the desired compound begins to be formed and maintaining the then prevailing conditions while avoiding production in the final product of dominant amounts of a carbonate-bicarbonate mixture as such.

10. The process of forming a sodium compound distinguished by the refractive indices of $\alpha$ about 1.435 and $\gamma$ about 1.526 which comprises heating crude sodium bicarbonate of the ammonia soda process at a temperature not materially exceeding 100° C. until the desired compound begins to be formed and maintaining the then prevailing conditions while avoiding production in the final product of dominant amounts of a carbonate-bicarbonate mixture as such.

11. The process of forming a sodium compound which consists in heating sodium bicarbonate at a temperature relatively low, but sufficiently high to start evolution of $CO_2$ and the formation of a compound of the bicarbonate and carbonate and maintaining the then prevailing conditions while avoiding production in the final product of dominant amounts of a carbonate-bicarbonate mixture as such.

12. The process of forming a sodium compound intermediate between sodium bicarbonate and sodium sesquicarbonate which consists in heating sodium bicarbonate at a temperature and for a time sufficient to start the evolution of $CO_2$ and the formation of the said intermediate compound and maintaining the then prevailing conditions while avoiding production in the final product of dominant amounts of carbonate-bicarbonate mixture as such.

13. In the art of producing a reaction between sodium carbonate and sodium bicarbonate that improvement which consists in producing or bringing together the two said reagents under conditions favorable to the formation of a compound intermediate the bicarbonate and sesquicarbonate, but unfavorable to the formation of dominant amounts of a carbonate-bicarbonate mixture as such in the final product and maintaining said conditions until said intermediate compound free from dominant amounts of carbonate, bicarbonate or sesquicarbonate as such is obtained as the final product of the reaction.

In witness whereof, I have hereunto signed my name this 26th day of September, 1922.

HERBERT EDWIN COCKSEDGE.